(12) United States Patent
Kozlowski

(10) Patent No.: US 10,093,208 B2
(45) Date of Patent: Oct. 9, 2018

(54) THERMALLY CONDUCTIVE LEATHER

(71) Applicant: Magna Seating Inc, Aurora (CA)

(72) Inventor: Eric Kozlowski, Oakland Township, MI (US)

(73) Assignee: Magna Seating Inc., Aurora, Ontario (CA)

(*) Notice: Subject to any disclaimer, the term of this patent is extended or adjusted under 35 U.S.C. 154(b) by 0 days.

(21) Appl. No.: 15/474,240

(22) Filed: Mar. 30, 2017

(65) Prior Publication Data
US 2017/0282767 A1    Oct. 5, 2017

Related U.S. Application Data

(60) Provisional application No. 62/315,239, filed on Mar. 30, 2016.

(51) Int. Cl.
| B60N 2/58 | (2006.01) |
|---|---|
| H01B 1/22 | (2006.01) |
| H01B 1/24 | (2006.01) |
| B60N 2/56 | (2006.01) |
| B60N 2/64 | (2006.01) |
| B60N 2/20 | (2006.01) |

(52) U.S. Cl.
CPC ............ *B60N 2/58* (2013.01); *B60N 2/5678* (2013.01); *H01B 1/22* (2013.01); *H01B 1/24* (2013.01); *B60N 2/20* (2013.01); *B60N 2/64* (2013.01)

(58) Field of Classification Search
CPC .. A41D 19/0006; A41D 19/00; A41D 19/001; B60N 2/58; B60N 2/5678; B60N 2/002; B60N 2/20; B60N 2/56; B60N 2/64; B60R 13/02

USPC ............. 297/180.1–180.12, 219.1–229
See application file for complete search history.

(56) References Cited

U.S. PATENT DOCUMENTS

| | | | |
|---|---|---|---|
| 7,419,209 B1* | 9/2008 | Mangiapane ...... | B60H 1/00278 180/65.1 |
| 8,507,102 B1* | 8/2013 | O'Leary ............... | C14C 11/003 428/473 |
| 9,051,621 B2* | 6/2015 | Leto ...................... | C09D 175/04 |
| 2004/0063366 A1* | 4/2004 | Nakayama ........... | D06N 3/0004 442/104 |
| 2004/0237170 A1* | 12/2004 | Yamazaki ............ | A41D 19/015 2/159 |
| 2009/0075019 A1* | 3/2009 | Loos .................. | A41D 19/0006 428/102 |
| 2010/0090966 A1* | 4/2010 | Gregorio ............ | A41D 19/0024 345/173 |
| 2012/0128995 A1* | 5/2012 | Leto ...................... | C09D 175/04 428/473 |
| 2012/0237783 A1* | 9/2012 | Leto ...................... | C09D 175/04 428/473 |
| 2015/0017421 A1* | 1/2015 | Sotzing .................. | H01B 1/127 428/323 |
| 2015/0185872 A1* | 7/2015 | Leto ........................ | G06F 3/044 2/167 |

(Continued)

*Primary Examiner* — Shin H Kim
(74) *Attorney, Agent, or Firm* — Miller Canfield

(57) ABSTRACT

A thermally conductive trim cover is provided for use on a seat assembly. The trim cover comprises a layer of leather material having a top surface and a bottom surface and thermally conductive particles embedded in the leather material between the top and bottom surface for dispersing heat therethrough.

6 Claims, 3 Drawing Sheets

(56) References Cited

U.S. PATENT DOCUMENTS

| | | | | |
|---|---|---|---|---|
| 2015/0376832 A1* | 12/2015 | Li | ............................ | D06N 3/14 |
| | | | | 428/423.3 |
| 2016/0144690 A1* | 5/2016 | Wittkowski | ............ | H05B 3/145 |
| | | | | 219/202 |
| 2017/0066355 A1* | 3/2017 | Kozlowski | ............ | B60N 2/5678 |
| 2017/0282767 A1* | 10/2017 | Kozlowski | ................ | B60N 2/58 |
| 2017/0291518 A1* | 10/2017 | Kozlowski | ............... | B60N 2/002 |

\* cited by examiner

THERMALLY CONDUCTIVE LEATHER

CROSS-REFERENCE TO RELATED APPLICATIONS

This application claims priority to and all the benefits of U.S. Provisional Application No. 62/315,239, filed on Mar. 30, 2016.

BACKGROUND OF THE INVENTION

1. Field of the Invention

The present invention relates to a thermally conductive leather material. More particularly, the invention relates to a thermally conductive leather trim cover for an automotive seat assembly having embedded conductive particles for efficiently dispersing the heat from the surface of the seat assembly.

2. Description of Related Art

Automotive vehicles include one or more seat assemblies having a seat cushion and a seat back for supporting a passenger or occupant above a vehicle floor. The seat assembly is commonly mounted to the vehicle floor by a riser assembly. The seat back is typically operatively coupled to the seat cushion by a recliner assembly for providing selective pivotal adjustment of the seat back relative to the seat cushion.

It is commonly known to provide seat assemblies with heating and cooling mechanisms for selectively heating and cooling the surface of the seat for seat occupant comfort. These known heating and cooling mechanisms are typically independent mechanisms. For example, it is common to provide an electric wire heating pad between the foam pad and trim cover of the seat cushion or seat back which is electrically actuated by the power from the vehicle battery to electrically charge the heating pad and provide heat to the surface of the seat cushion or seat back. It is also known to provide fans and air ducts to force cool air through the foam pad and trim cover and provide cool air to the surface of the seat cushion or seat back. It is also known to provide fans and ducts to draw warm, moist air away from the seating surface to provide a gradual cooling effect.

Leather trim is commonly used in automotive seating applications for covering the foam pad of the seat assembly to provide occupant comfort, styling and aesthetics. The leather provides a soft surface, comfort to the user, durability for the life of the surface, and a luxurious appearance and experience. However, leather also has the disadvantage of having very low thermal conductivity. As a result, heat can build up between the user and the leather material. Additionally, when there are heating and cooling mechanisms present under the seating surface, the leather acts as an insulator. Therefore, the desired heating and cooling effects take considerable time to be felt by the seat occupant. The heating and cooling mechanisms also have to operate at a higher power level to overcome the insulative effects of the leather trim cover.

Therefore, it is desirable to provide a thermally conductive leather trim cover for dispersing the heat to and from the surface of the seat assembly and reduce the undesirable insulative effects thereof.

SUMMARY OF THE INVENTION

A thermally conductive trim cover is provided for use on a seat assembly. The trim cover comprises a layer of leather material having a top surface and a bottom surface and thermally conductive particles embedded in the leather material between the top and bottom surface for dispersing heat therethrough.

A seat assembly is also provided for use in an automotive vehicle. The seat assembly comprises a resilient cellular foam pad for supporting an occupant on the seat assembly, a trim cover covering the foam pad, and a heat and cooling mechanism positioned between the foam pad and the trim cover for selectively providing thermal effects to the seat assembly. The trim cover comprises a layer of leather material having a top surface and a bottom surface and thermally conductive particles embedded in the leather material between the top and bottom surface for dispersing heat from the heating and cooling mechanism through the trim cover.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
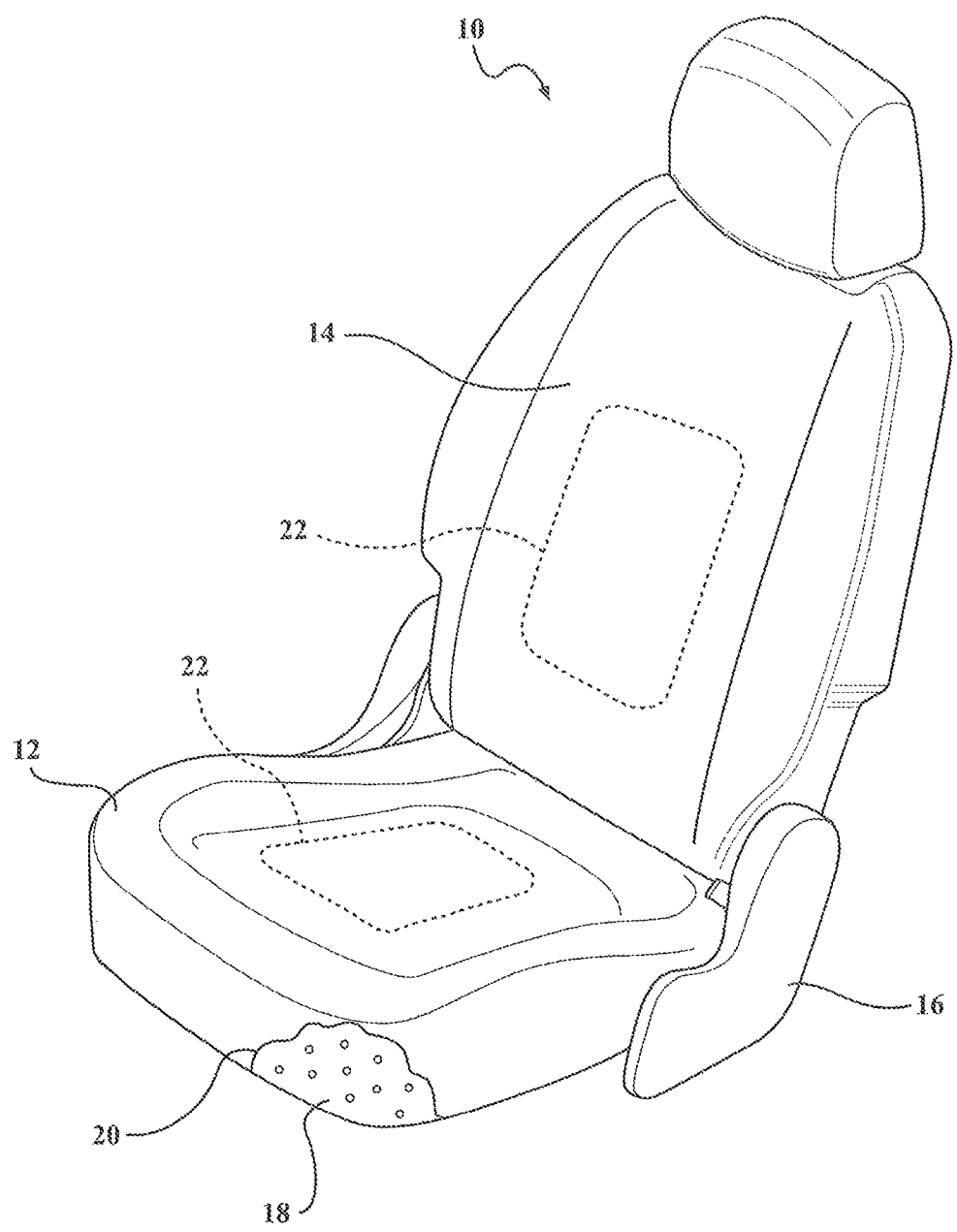
FIG. 1 is a fragmentary perspective view of a seat assembly for an automotive vehicle.

Referring to the Figures, wherein like numerals indicate like or corresponding parts throughout the several views, a seat assembly 10 for use in an automotive vehicle is generally shown in FIG. 1 and includes a generally horizontal seat cushion 12 and a generally upright seat back 14 for supporting a seat occupant within the vehicle as is commonly known in the art. The seat back 14 is typically operatively coupled to the seat cushion 12 by a recliner assembly 16 for providing pivotal movement between an upright seating position and a plurality of reclined seating positions.

Each of the seat cushion 12 and seat back 14 commonly include a molded resilient cellular foam pad 18 encased in a trim cover assembly 20, commonly of cloth, vinyl, or leather. A heating and cooling mechanism (shown schematically at 22) is generally operatively coupled to the seat cushion 12 and/or seat back 14 between the foam pad 18 and trim cover 20 for selectively heating and cooling the surface of the seat assembly 10.

Figure 2:
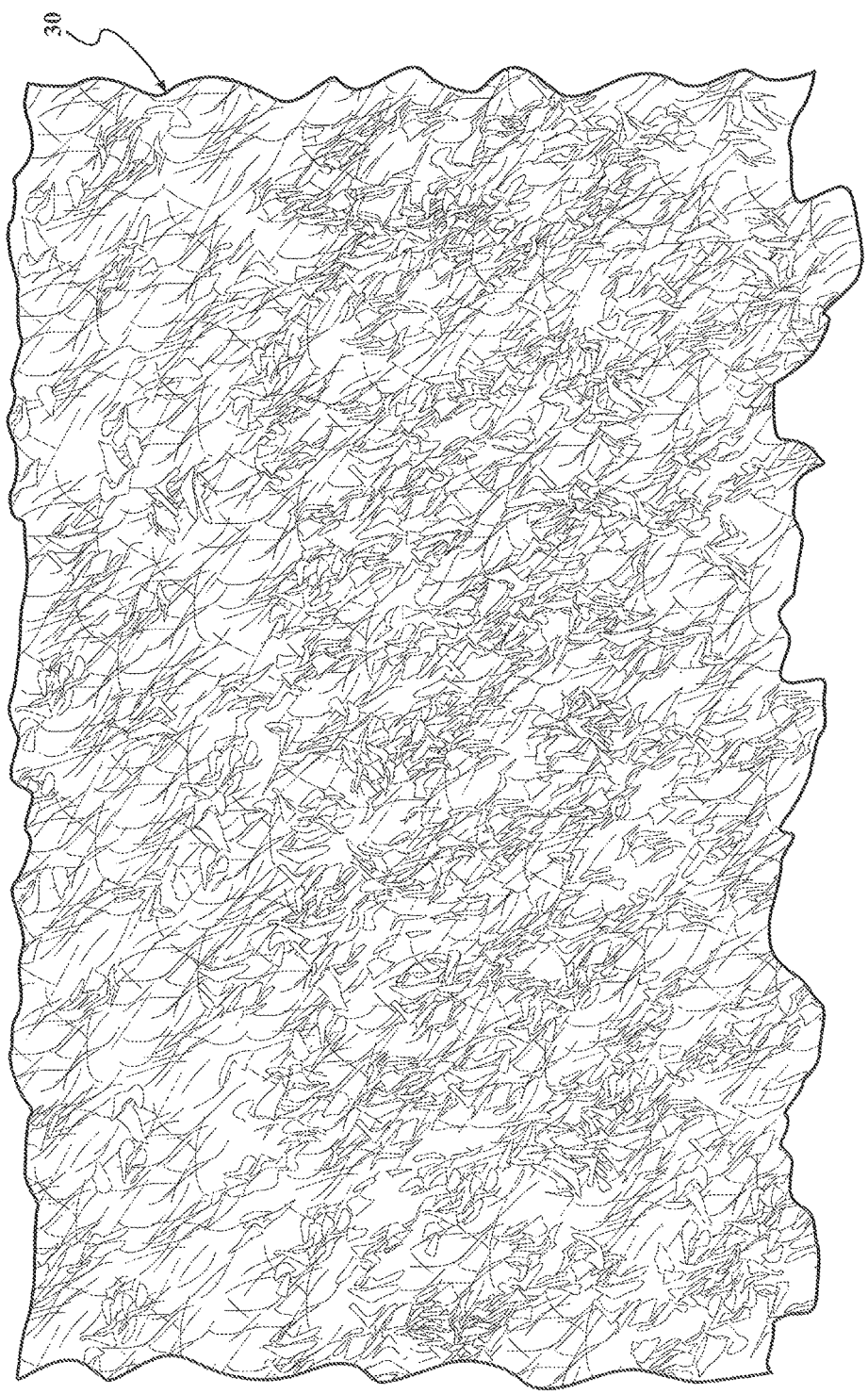
FIG. 2 is a magnified cross-sectional view of a leather trim cover as known in the prior art.

Referring to FIG. 2, a magnified cross-sectional view of a traditional prior art leather trim cover is shown at 30. The cross-section of leather is magnified at approximately 60× and illustrates a 3-dimensional weave formed by the skin of the animal. Tanning of the leather is done to add stable oils for softness, color and other desired effects as is commonly known in the art. The finished leather surface is very soft and durable, however, is also highly insulative.

Figure 3:
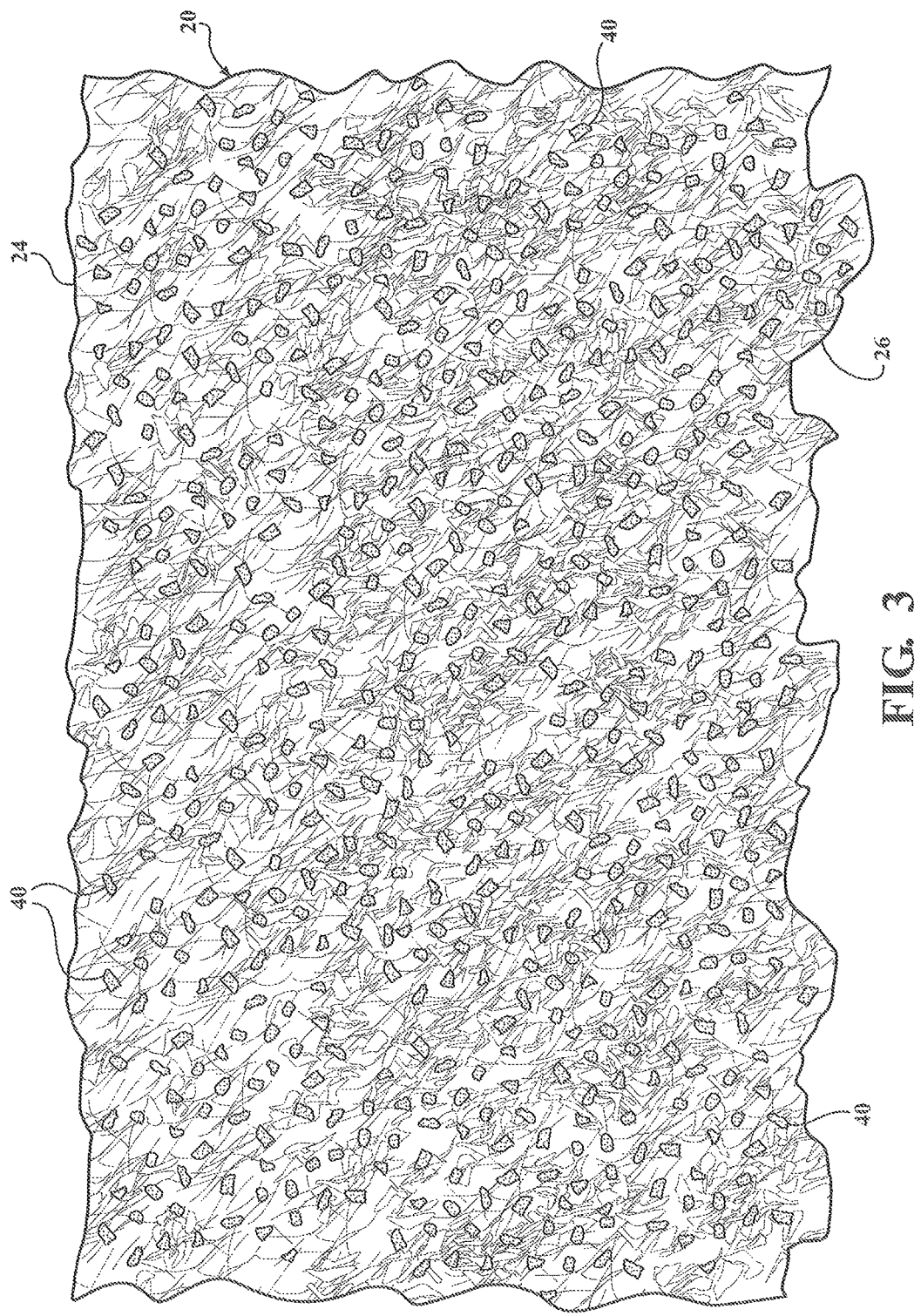
FIG. 3 is a magnified cross-sectional view of a thermally conductive leather trim cover with embedded conductive particles according to one embodiment of the invention.

The present invention relates to providing additives to the leather tanning process to enhance the thermal properties of the leather trim cover 20. Referring to FIG. 3, a magnified cross-sectional view of a leather trim cover according to one embodiment of the invention is shown at 20 having a top surface 24 and a bottom surface 26. The cross-section of leather is also magnified at approximately 60×. However, the leather trim cover 20 shown includes randomly dispersed and embedded thermally conductive particles 40 spread throughout the 3-dimensional weave of the leather and spread between the top surface 24 and bottom surface 26. More specifically, the leather trim cover 20 is embedded with particles 40 consisting of aluminum, aluminum oxide, graphite, graphene, silver, copper, carbon nanotubes, or any other suitable conductive filler material to enhance the thermal conductivity of the leather material. The addition of the embedded particles 40 increases the thermal conductivity of the leather trim cover from 0.098 W/m-K for untreated leather to 0.1308 W/m-K for the leather treated with the embedded conductive particles 40, a 33% improvement in thermal conductivity. Further, in addition to improving the thermal conductivity of the leather trim cover 20, the embedded particles 40 also electrically isolate the heating and cooling mechanism within the seat assembly 10. It should also be appreciated that the leather trim cover 20 may be used in automotive seating applications, residential or commercial furniture, garment, or upholstery leather applications.

The following formulation chart illustrates the preferred embodiment of the formulation and processing of the thermally conductive leather trim cover 20 using various sizes of graphite embedded particles 40 to improve the thermal conductivity of the leather material.

| | Thermal Conductivity Initial: | 0.0980 | W/m-K |
|---|---|---|---|
| (Note: Formula % is based off of initial hide weight) | | | |
| Formula % | Product | Dilution | Time |
| 200.0% | Water 35° C. | | |
| 0.2% | Peltec ADN (wetting agent) | 1:4 | |
| 0.3% | Formic Acid (reduces pH) | 1:10 | 30 min |
| | Drain | | |
| 100.0% | Water 50° C. | | |
| 1.5% | Tanigan PAK (syntan) | | |
| 1.0% | Sodium Formate (raises pH) | | 20 min |
| 2.0% | Eureka 950-R (fatliquor) | 1:4 | |
| 40.0% | 0.6 micron Graphite | | |
| 40.0% | 5.0 micron Graphite | | |
| 20.0% | 20 micron Graphite | | |
| 1.0% | Sodium Bicarbonate (raises pH) | | 180 min |
| | Drain & Wash | | |
| 70.0% | Water 50° C. | | |
| 4.0% | Leukotan 1084 (syntan) | 1:3 | |
| 40.0% | 0.6 micron Graphite | | |
| 40.0% | 5.0 micron Graphite | | |
| 20.0% | 20 micron Graphite | | |
| 2.0% | Eureka 950-R (fatliquor) | 1:4 | 20 min |
| 40.0% | 0.6 micron Graphite | | |
| 40.0% | 5.0 micron Graphite | | |
| 20.0% | 20 micron Graphite | | |
| 8.0% | Tanigan VR (syntan) | | 20 min |
| 40.0% | 0.6 micron Graphite | | |
| 40.0% | 5.0 micron Graphite | | |
| 20.0% | 20 micron Graphite | | |
| 4.0% | Tara (tannin) | | |
| 3.0% | Baykanol PFM/Retingan ZF Plus | | |
| 1.5% | Tanigan PR (syntan) | | 40 min |
| | Drain | | |
| 100.0% | Water 60° C. | | |
| 2.0% | Formic Acid (reduces pH) | 1:10 | |
| 10.0% | Tannesco FC (tanning agent) | | overnight |
| | Drain & Wash | | |
| 150.0% | Water 60° C. | | |
| 3.0% | Lubritan SP (syntan) | | |
| 40.0% | 0.6 micron Graphite | | |
| 40.0% | 5.0 micron Graphite | | |

-continued

| | Thermal Conductivity Initial: | 0.0980 | W/m-K |
|---|---|---|---|
| (Note: Formula % is based off of initial hide weight) | | | |
| Formula % | Product | Dilution | Time |
| 20.0% | 20 micron Graphite | | |
| 7.0% | Eureka 950-R (fatliquor) | 1:5 | 120 min |
| 40.0% | 0.6 micron Graphite | | |
| 40.0% | 5.0 micron Graphite | | |
| 20.0% | 20 micron Graphite | | |
| 10.0% | Tannesco FC (tanning agent) | | |
| 2.0% | Formic Acid (reduces pH) | 1:5 | 120 min |
| | Drain & Wash | | |
| Thermal Conductivity Final: | | 0.1308 | W/m-K |

In a typical leather tanning process, as is commonly known in the art, the leather hide is soaked in a water solution in large slowly turning or agitating drums for predetermined amounts of time. The water solution includes various added chemicals, such as lime, sodium sulphide, ammonium sulphate, sulphuric acid, sodium bicarbonate, and others to desalt, delime and neutralize the leather. The leather is then allowed to drain and dry and may be buffed as desired to correct surface defects. The above chart illustrates the formulation of the water solution with the added chemicals and graphite particles for saturating and dispersing the graphite into the leather during the tanning process.

Specifically, by reference to the formulation chart, the leather hide is soaked in a water solution at a specific temperature with the additives, chemicals, and materials listed for a specified period of soaking time. As shown in the chart, the dilution ratios of the chemicals are listed along with the weight of each ingredient in the solution (based as a percentage of the total hide weight), and the specified soaking times for each step of the process. For example, the leather hide is initially soaked in a drum with a solution of water at 35 degrees Celsius, Peltec AND, and Formic Acid at the listed percentages by weight and dilution ratios for a time period of 30 minutes. Each additional step in the process then adds the specified solution, chemicals, materials, or ingredients of the formulation for the next specified period of soaking time. For example, the chart shows the next step to include an additional water solution at 50 degrees Celsius with the other listed chemicals for another 20 minutes of soaking time. The third step includes the addition of Eureka 950-R, Sodium Bicarbonate and the three different micron sizes of Graphite particles to the solution for an additional 180 minutes of soaking time. The leather hide is then drained and washed. The process continues as illustrated in the formulation chart with additional soaking and saturation with varying micron sizes of Graphite particles into the leather for specified amounts of soaking time until the final draining and washing of the leather hide. The process and formulation includes the various steps of adding different sizes of Graphite particles into the solution for various periods of soaking time to allow the Graphite particles to fully saturate, disperse and be embedded into the leather hide thereby increasing the thermal conductivity from an initial level of 0.0980 W/m-K to the resulting level of 0.1308 W/m-K.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A thermally conductive trim cover adapted for use on a seat assembly, said trim cover comprising a layer of leather material having a top surface and a bottom surface and thermally conductive particles embedded in said leather material between said top and bottom surface for dispersing heat therethrough.

2. The thermally conductive trim cover as set forth in claim 1 wherein the thermally conductive particles include graphite embedded is said leather material and spaced apart between said top and bottom surface.

3. The thermally conductive trim cover as set forth in claim 2 wherein the thermally conductive particles are selected from the group consisting of graphite, graphene, aluminum, aluminum oxide, silver, copper, or carbon nanotubes.

4. A seat assembly for use in an automotive vehicle, said seat assembly comprising: a resilient cellular foam pad for supporting an occupant on said seat assembly; a trim cover covering said foam pad; a heating and cooling mechanism positioned between said foam pad and said trim cover for selectively providing thermal effects to said seat assembly; and said trim cover comprising a layer of leather material having a top surface and a bottom surface and thermally conductive particles embedded in said leather material between said top and bottom surface for dispersing heat from said heating and cooling mechanism through said trim cover, a layer of cellular foam padding having a top surface and a bottom surface; and a plurality of thermally conductive materials embedded in said foam padding and extending continuously between said top surface and said bottom surface to transmit thermal energy through said foam padding between said top and bottom surfaces.

5. The seat assembly as set forth in claim 4 wherein the thermally conductive particles include graphite embedded is said leather material and spaced apart between said top and bottom surface.

6. The seat assembly as set forth in claim 5 wherein the thermally conductive particles are selected from the group consisting of graphite, graphene, aluminum, aluminum oxide, silver, copper, or carbon nanotubes.

* * * * *